June 17, 1969    D. W. McCULLOCH    3,450,053
ADDITIVE PROPORTIONING AND INJECTION SYSTEM
Filed March 10, 1967
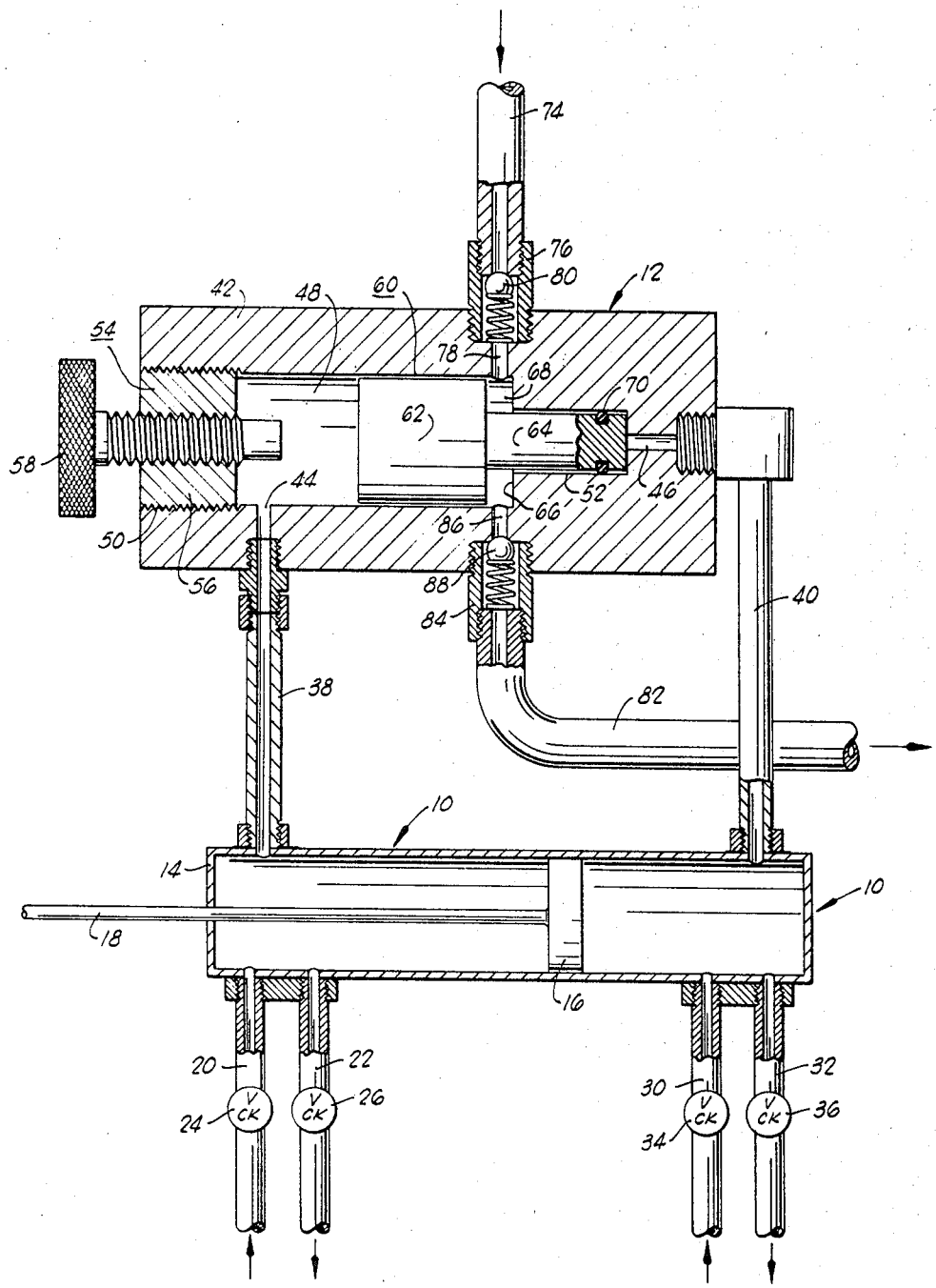
INVENTOR.
DOYLE W. McCULLOCH
BY
Dunlap and Laney
ATTORNEYS

United States Patent Office 3,450,053
Patented June 17, 1969

3,450,053
ADDITIVE PROPORTIONING AND INJECTION SYSTEM
Doyle W. McCulloch, 630 Walnut Circle E., Garland, Tex. 75040
Filed Mar. 10, 1967, Ser. No. 622,212
Int. Cl. F04b 13/02, 19/06, 15/00
U.S. Cl. 103—6                                7 Claims

ABSTRACT OF THE DISCLOSURE

A compound pump for proportionately combining an additive with a flowing fluid stream. A double acting main reciprocating pump delivers a fluid into which a small predetermined amount of a fluid additive is to be introduced. A reciprocating proportioning pump is connected to the main pump so that each stroke of the main pump hydraulically drives a compound piston in the proportioning pump to draw the additive into, and discharge it from, a chamber in which the compound piston moves. The length of stroke of the compound piston can be externally adjusted to control the amount of additive discharged at each stroke. In one form of the invention, the compound piston fits loosely in the chamber in which it moves so that where the fluid pumped by the main pump, and the additive, are both liquids, the driving liquid by-passes the compound piston so that the proportioning pump is self-priming and air locking is avoided.

THE FIELD OF THE INVENTION

This invention relates to proportioning devices for mixing fluids in a predetermined proportion. More specifically, but not by way of limitation, the present invention relates to compound pumping devices which function to pump a main stream of liquid and to simultaneously add to this stream, a predetermined amount of an additive liquid.

BACKGROUND OF THE INVENTION

*Description of the prior art*

Many devices have been heretofore proposed for mixing plural fluids in a constant predetermined proportion while the fluids are being moved concurrently toward a common destination. In such devices, it is frequently quite important that a relatively small amount of an additive material be added continuously to a flowing stream in a constant proportion, subject to changing such proportion at will and to a precise predetermined degree. In instances where the proportional addition of one liquid to another is contemplated, it is sometimes highly desirable that precise proportional mixing be accomplished as soon after start up of the device as possible. One often encountered condition which renders the achievement of accurate initial proportioning difficult in such liquid additive systems is the entrainment of air in the liquid as the device used to measure it out and move it into the other stream becomes primed. So-called air locking also occasionally develops at the time of start up, temporarily inactivating the system.

*Brief description of the invention*

The present invention provides an accurate and reliable apparatus for proportionately mixing fluids in a continuous fashion. Broadly described, the proportioning apparatus of the invention comprises a first pump of the reciprocating, double acting type which can be termed the main or master pump, and a second reciprocating pump which is connected to, and driven by, the first pump, and which functions to measure out and deliver pulses of a material to be incorporated in a predetermined amount of another material pumped by the first or master pump.

The second pump comprises a housing having a hollow interior, and a compound free piston mounted for reciprocation in the housing and having a relatively large diameter portion moving in a bore in the housing, and a smaller diameter portion extending into a counterbore which communicates with the bore. Means is secured in the housing for adjusting the length of the stroke of the free piston, and conduit means is connected between the bore and counterbore of the housing and the main pump for supplying a power fluid from the main pump to the second pump to drive the free piston in reciprocation during reciprocation of the main pump. A pair of additive conduits are connected to the housing of the second pump, and respectively communicate with the bore therein through a pair of oppositely acting check valves. Thus the reciprocation of the free piston in the housing draws additive into, and discharges additive from, the bore in the housing of the second pump.

The amount of additive discharged from the second pump upon each stroke of the free piston is constant provided the stroke length of this piston remains unchanged. As noted above, however, means is provided for adjusting this stroke length. This may be easily accomplished manually, and while the pumps are operating, to alter in a controlled manner the ratio of the proportionate delivery.

In a preferred embodiment of the invention, useful for proportionately delivering two liquids, the large diameter portion of the compound free piston is constructed undersized with respect to the bore in which it moves, and which receives and measures the additive material. This permits driving liquid delivered from the main pump to this bore to by-pass the large diameter portion of the compound free piston and enter the portion of the bore into which the additive liquid is to be drawn. The second or proportioning pump is thus rapidly primed and air lock and air entrainment is avoided following start up of the main pump.

From the foregoing description of the invention, it will have become apparent that it is an important object of the invention to provide an improved additive proportioning system which will accurately measure out and dispense a fluid in proportion to an amount of a second fluid being continuously pumped by the system.

Another object of the invention is to provide a liquid proportioning apparatus which is self-priming and reduces to a minimum the amount of gas entrained in the proportioned liquid.

An additional object of the invention is to provide a fluid proportioning system which pumps two fluids in a predetermined ratio to each other and which can be adjusted to vary such ratio without interruption of the pumping.

In addition to the described objects, other objects and advantages of the invention will become apparent as the following detailed description is read in conjunction with the accompanying drawing which illustrates the invention.

BRIEF DESCRIPTION OF THE DRAWINGS

The sole figure of the drawing illustrates a preferred embodiment of the proportioning apparatus of the invention, with such apparatus being illustrated partially in section and partially in elevation.

DESCRIPTION OF A PREFERRED EMBODIMENT OF THE INVENTION

In describing the structure appearing in the drawing, reference numeral lead lines with arrowheads have been employed to designate major combinations which include a plurality of subassemblies. Reference numerals have been underlined where they are used to designate a subassembly included in a combination, and itself including a plurality of individual elements. Plain reference numerals and lead lines are utilized to indicate individual elements.

In the drawing, the proportioning apparatus of the invention may be described as including a pair of pump assemblies or pump means, these pump assemblies being more specifically identifiable as a first or main double acting reciprocating pump 10, and a second or proportioning double acting reciprocating pump 12. Referring initially to the main pump 10, the main pump includes an elongated, generally cylindrical body or housing 14 which encloses a piston 16 which is secured to an elongated piston rod 18 extending through one end wall of the housing 14. The piston rod 18 is secured to any suitable type of prime mover capable of developing a reciprocating motion in this element.

On one side of the piston 16 and adjacent one end of the housing 14, a fluid inlet pipe or conduit 20 is secured to the housing and communicates with the interior thereof, and a fluid discharge conduit 22 is likewise secured to the housing and communicates with the interior thereof. The fluid inlet conduit 20 contains a check valve 24 which prevents flow backward through this conduit from the cylindrical housing 14, and the fluid discharge conduit 22 contains a check valve 26 which prevents flow from this conduit into the cylindrical housing 14. On the opposite side of the piston 16 from the side upon which the fluid inlet conduit 20 and fluid discharge conduit 22 are located, a second fluid inlet conduit 30 and a second fluid discharge conduit 32 are connected to the cylindrical body 14 and are in communication with the interior thereof. The conduits 30 and 32 contain check valves 34 and 36 which function in the same manner as the check valves 24 and 26 located in the conduits 20 and 22.

Secured to the cylindrical housing 14 and positioned on opposite sides of the piston 16 are also an additional pair of fluid conduits 38 and 40, hereinafter termed drive fluid supply conduits. The power fluid supply conduits 38 and 40 are connected to a block or housing 42 so as to communicate with ports 44 and 46 formed in this housing. The housing 42 is provided with a bore 48 having a relatively large diameter and internally threaded adjacent its opening at one end of the housing as designated by reference numeral 50. Coaxially aligned with the bore 48 is a counterbore 52 which is of substantially lesser diameter than the bore 48. The positions of the power fluid supply conduits 38 and 40 and their respective passageways 44 and 46 are such that the power fluid supply conduits 38 and 40 are placed in communication with the bore 48 and counterbore 52, respectively, through the fluid passageways 44 and 46 in the housing 42.

Threaded into the threaded open end of the bore 48 is a stroke adjusting assembly 54. The stroke adjusting assembly 54 includes a threaded plug block 56, which engages the threads of the bore 48 and closes this bore, and an adjustable stop screw 58. The adjustable stop screw 58 is threaded into the plug block 56, and is adjustable in the distance which its inner end extends into the bore 48. The function of the stroke adjusting assembly 54 will be hereinafter described.

Positioned in the housing 42 of the proportioning pump 12 so as to be freely movable in the bore 48 and in the counterbore 52 is a compound free piston 60. The compound free piston 60 includes a relatively large diameter portion 62 which is positioned in the bore 48, and a small diameter portion 64 which is secured to one end of a large diameter portion 62 and extends therefrom into the counterbore 52. The length of the small diameter portion 64 of the compound free piston 60 is such that when the free end of this small diameter portion abuts the end of the counterbore 52, as shown in the figure of the drawings, the large diameter portion 62 of the compound piston 60 is necessarily spaced from the nearest adjacent end of the bore 48, this end of the bore being identified in the drawing by reference numeral 66. To further facilitate the description of the invention and an understanding of its operation, the space equivalent to the portion of the bore 48 which exists between the end 66 of this bore and the large diameter portion 62 of the compound free piston is indicated by reference numeral 68. The small diameter portion 64 of the compound piston 60 is provided with a circumferential groove which carries an O-ring or other suitable sealing structure to prevent by-pass of power fluid from the passageway 46 around the small diameter portion of the compound piston, and also to prevent leakage of additive from the space 68 as hereinafter described.

An additive or other material to be proportioned and dispensed by the apparatus of the invention and, more specifically, by the proportioning pump 12 is passed through an additive inlet conduit 74 which is secured to a check valve housing 76. The check valve housing 76 is in turn threaded into or otherwise suitably secured to the housing 42 of the proportioning pump so as to place the additive inlet conduit 74 in communication with a passageway 78. The passageway 78 in the proportioning pump housing 42 communicates with the bore 48 and, more specifically, with the chamber 68 which as hereinbefore defined is that portion of the bore 48 between the large diameter portion 62 of the compound piston 60 and the end 66 of the bore 48. The check valve housing 76 houses or contains a check valve 80 which is mounted to prevent retrograde flow from the space or chamber 68 into the additive inlet conduit 74.

On the opposite side of the housing 42 from that side to which the additive inlet conduit 74 is connected, an additive discharge conduit 82 is connected through a check valve housing 84 to the proportioning pump housing 42 and communicates with a passageway 86 therein. The check valve housing 84 contains a check valve 88 which is mounted to prevent flow of fluid from the additive discharge conduit 82 into the chamber 58 via the passageway 86 and for permitting flow in the opposite direction.

OPERATION

One of the most useful applications of the proportioning apparatus of the invention is that of proportionately mixing a small amount of additive with a continuously flowing main stream of another fluid. A more specific use which can be made of the apparatus is that of adding liquid soap or detergent to a constantly flowing stream of water where such water-soap mixture is employed in an automatic vehicle washing system. It is with respect to this use of the invention that its operation will be described, although it is to be understood that this utilization of the invention is only intended to be exemplary of a number of uses which may be made of it.

Let it be assumed that a stream of water into which a small, predetermined amount of a liquid detergent is to be periodically, and at regular intervals, injected is developed by the use of the double acting reciprocating main pump 10. Thus, water from an available supply is drawn through the intake conduit 20 into the cylindrical housing 14 by reciprocation of the piston 16 toward the right hand end of the housing as the cylinder and piston are viewed in the figure of the drawings. At the same time, water which has previously been introduced to the opposite end of the cylindrical housing 14 by the stroking action of the piston 16 is discharged by forcing it through the fluid discharge conduit 32 connected to the opposite end of the housing. During the stroke of the piston 16 in this direction, the fluid in the right hand end of the cylindrical housing 14 is prevented from passing into the fluid inlet conduit 30 by the presence of the check valve 34. In like manner, no fluid is drawn into the left hand end of the cylindrical housing 14 through the fluid discharge conduit 22 by reason of the presence of the check valve 26. Thus, it is seen that one of the functions of the double acting, reciprocating main pump 10 is to develop a stream of water or other fluid which is under sufficient pressure to be ejected at considerable velocity at a distal point of discharge, such as a spraying or a dispensing nozzle of an automatic car wash system.

Concurrently with the water pumping action of the main pump 10 described above, the pump concurrently functions to drive the proportioning pump 12. The proportioning pump 12 is driven from the main pump 10 by fluid (in the example under discussion, water) which is directed to the proportioning pump through the fluid supply conduits 38 and 40. Thus, as the piston 16 reciprocates to the right as the apparatus is viewed in the drawing, a portion of the water in the right hand end of the cylindrical housing 14 is directed through the fluid supply conduit 40 and through the passageway 46 against the end face of the small diameter portion 64 of the compound piston 60. Simultaneously with the direction of water against the end face of the small diameter portion 64 of the compound piston 60, a vacuum or suction is created in that portion of the bore 48 which is on the opposite side of the large diameter portion 62 of the compound piston 60 from the chamber 68. This reduction in pressure is developed as a result of the movement of the piston 16 to the right in the cylindrical housing 14. Thus, during this portion of the stroke of the piston 16, water is drawn into the cylindrical housing 14 from the fluid supply conduit 38 communicating with the bore 48, as well as from the fluid inlet conduit 20.

As the compound free piston 60 moves to the left, the chamber or space 68 between the enlarged portion 62 of the free piston and the end 66 of the bore 48 is itself enlarged, and a reduced pressure is created in this space or chamber by the movement of the free piston to the left. As a result of this reduction in pressure, fluid is drawn in from the additive inlet conduit 74 through the check valve housing 76 by concurrent unseating of the check valve 80. If liquids are to be proportioned by the proportioning pump 12, several strokes of the compound free piston 60 may be required before the liquid flows into, and fills, the chamber 68. As will be hereinafter explained, the construction of the present invention reduces the number of strokes of the compound free piston required to fill the chamber 68 with a liquid, and thus a self priming feature is provided which aids in preventing air entrainment in liquids being proportioned by the proportioning pump 12, and also prevents air locking.

The compound free piston 60 continues to move toward the left until either the piston 16 terminates and reverses its stroke, or until the enlarged portion 62 of the compound free piston 60 strikes the end of the adjustable stop screw 58. If the movement of the compound piston 60 is arrested by contact with the adjustable stop screw 58, flow of the liquid being pumped by the main pump 10 through the drive fluid supply conduit 40 is also stopped, and the only outlet for the liquid is then through the fluid outlet conduit 32. Since a more positive control can be maintained over the stroke length of the compound piston 60 by the use of the stroke adjusting screw 58, it is preferable that the stroke of the compound piston be terminated by contact with this element.

With the reversal of the direction of movement of the piston 16 by the prime mover (not shown), liquid which is in the left hand end of the cylindrical housing 14 is directed out of this housing through the fluid outlet conduit 22, and also is concurrently directed upwardly through the conduit 38. Movement of liquid from the conduit 38 through the passageway 44 into the bore 48 effectively forces the compound piston 60 toward the right within the bore 48. This movement of the compound piston places the fluid in the chamber 68 under compression, and thus causes it to open the check valve 88 and force it out through the check valve housing 84 into the discharge conduit 82. Simultaneously, the small diameter portion 64 of the compound piston 60 moves to the right in the counterbore 52 and effectively ejects fluid contained in this counterbore through the passageway 46 and into the conduit 40. Fluid from the conduit 40 moves into the right hand end of the cylindrical housing 14 and, along with fluid drawn into this end of the housing through the fluid inlet conduit 30, effectively fills the housing 14 to the right of the piston 16.

At such time as liquid is applied to the relatively large diameter left hand face of the enlarged portion 62 of the compound piston 60, the clearance which is provided between this piston and the walls of the bore 48, in a preferred embodiment of the invention, permits liquid to bypass the piston and enter the chamber 68. A substantial passage of liquid in this manner will occur during the first few strokes of the compound piston 60 so that the chamber is relatively rapidly filled with liquid, and little opportunity occurs for the entrainment of any air or other gas which might be drawn into the chamber 68 from the additive supply conduit 74 during the initial phases of operation following startup.

During the reciprocation of the compound free piston 60, an additive fluid is drawn into and dispensed from the chamber 68 during each stroke of the piston. The total volumetric size of the chamber 68 is constant so long as the stroke of the piston 60 remains constant. Thus, the proportioning pump 12 is dispensing through the discharge conduit 80 a constant amount of the additive fluid, and is effecting such dispensation in exact proportion to the amount of liquid pumped by the main pump 10. By adjustment of the stroke adjusting assembly 54, the length of stroke of the compound free piston 60 may be adjusted, and thus, even during the continued operation of the system, the amount or proportion of the additive material which is discharged from the proportioning pump 12 can be varied as may be desired.

In the application of the apparatus of the invention to a car washing system, the additive which is proportioned by the system may be a liquid soap material, and the fluid pumped by the main pump 10 is water. The liquid soap which is measured out accurately during each stroke of the compound piston 60 is then directed through the discharge conduit 82 to a point downstream from both pumps 10 and 12 where the additive is added back to the main stream of water prior to discharging the mixture through the dispensing nozzles or the like against a vehicle to be washed. An unloading valve may be interposed in the conduit 82 so that a certain pressure must be built up before the soap is injected into the water stream. The unloading valve tends to smooth out pulsations and assure an even delivery of the water-soap mixture to the dispensing heads or nozzles.

The provision of the undersized or small diameter compound piston 60 not only provides the advantage of bypassing liquid to prevent air entrainment and obviate air lock in the chamber 68, but also reduces the machining requirements applicable to the large diameter portion 62 of the compound piston 60. Thus, no criticality exists in machining this part of the piston 60 to fit precisely in bore 48.

Using the proportioning system of the invention, I have effectively metered, in a constant proportion, over a period of twelve hours, two ounces of liquid into a liquid pumped by the main pump 10 at the rate of two gallons per minute.

Although aspecific embodiment of the foregoing invention has been herein described in order to provide an example which will enable those skilled in the art to practice the invention, it is to be understood that various changes and modifications can be effected in the depicted system without departure from the principles upon which the invention is based.

What is claimed is:

1. A fluid proportioning apparatus comprising:
a double acting first reciprocating pump;
a proportioning pump comprising:
> a housing having an aligned bore and counterbore therein, with said counterbore being of smaller diameter than said bore;
> free piston means slidably mounted in said housing and having a first portion in said bore and a second portion connected to said first portion and extending part of the way into said counterbore, said first portion being dimensioned and geometrically configured relative to said bore to permit a fluid in said bore to by-pass said first portion for self-priming purposes;
> means for conveying, under the pumping influence of said piston means during its sliding movement in said housing, a fluid through that portion of said bore which is disposed on one side of said first portion of said free piston;
> a first conduit connected between said first pump and a portion of said bore on the opposite side of said first portion of said piston means from said first mentioned portion of said bore for conveying to said bore a fraction of the total fluid pumped by said first pump during one cycle of its double action; and
> a second conduit connected between said first pump and said counterbore for conveying to said counterbore a fraction of the total fluid pumped by said first pump during the other cycle of its double action.

2. A fluid proportioning apparatus comprising:
a double acting first reciprocating pump;
a second reciprocating pump connected to said first pump for responding by pumping to the pumping action of said first pump, said second pump comprising:
> a housing having a bore and a counterbore axially aligned with said bore;
> a free piston reciprocably mounted in said housing and having a first portion mounted in said bore and undersized with respect to said bore for permitting fluid to by-pass said first portion to thereby prime said second reciprocating pump, and said free piston having a second portion extending from said first portion into a part of said counterbore;
> means for introducing to said bore at a point between said first portion and said counterbore, a fluid to be pumped at a rate proportional to the pumping rate of said double acting first pump;
> means for removing said fluid from said bore at a point between said first portion and said counterbore at a rate proportional to the pumping rate of said double acting first pump; and
> means extending through said housing and for an adjustable distance into said bore to limit the distance said free piston can move in said housing whereby the stroke of said free piston in said housing may be adjusted.

3. Apparatus for porportionately pumping a small measured quantity of an additive fluid while concurrently pumping a relatively large quantity of a second fluid concurrently and in a constant ratio with respect to the additive fluid, said apparatus comprising:
a double acting, first reciprocating pump;
an additive proportioning pump comprising:
> a housing having a cylindrical bore and an axially aligned, communicating counterbore therein, with said counterbore being of smaller diameter than said bore;
> a free compound piston slidably mounted in the bore and counterbore within said housing and having a first, relatively large diameter, cylindrical portion in said bore and a second, cylindrical portion of smaller diameter than said first portion connected to and extending axially from said first portion, said second portion of said free piston extending part of the way into said counterbore and being of greater length than said counterbore whereby when said second portion abuts the end of said counterbore remote from said bore, said first portion of said free piston is spaced from one end of said bore adjacent said counterbore, said first cylindrical portion of said free piston having a diameter which is less than the diameter of said bore to permit fluid in said bore to by-pass said free piston;
> a first pair of conduits connected to said double acting, first reciprocating pump for conveying said second fluid to said double acting, first reciprocating pump during one cycle of the double action thereof, and for conveying a major fraction of said second fluid away from said double acting, first reciprocating pump during the second cycle of the double action thereof;
> a second pair of fluid conduits connected to said double acting first reciprocating pump for conveying said second fluid to said double acting, first reciprocating pump during said second cycle, and for conveying a major fraction of said fluid to be pumped from said double acting, first reciprocating pump during said one cycle of said double action thereof;
> a fifth fluid conduit connected between said first reciprocating pump and a portion of the bore in the housing of said proportioning pump which is located on the opposite side of said free piston from said counterbore for conveying from said first reciprocating pump to said bore, a fraction of the total fluid pumped by said first pump during one cycle of its double action;
> a sixth conduit connected between said first reciprocating pump and the end of said counterbore in the housing of said proportioning pump which is remote from the end intersecting said bore for conveying to said counterbore a fraction of the total fluid pumped by said first pump during the second cycle of its double action;
> an additive fluid inlet conduit connected to said housing and communicating with said bore on the side of the large diameter portion of said free piston on which said counterbore is located;
> a check valve in said additive fluid inlet conduit preventing flow of fluid from said bore into said additive fluid inlet conduit while permitting flow of fluid in the opposite direction;
> an additive fluid discharge conduit connected to said housing and communicating with said bore on the side of the large diameter portion of said free piston on which said counterbore is located;
> a second check valve in said additive fluid discharge conduit and preventing flow of said additive fluid from said additive fluid discharge conduit into said bore while permitting flow of fluid in the opposite direction; and
> an adjustable stop screw threadedly mounted in said housing and extending into said bore on the opposite side of the large diameter portion of said free piston from said counterbore for contact with said free piston at one time during its stroke, said stop screw being adjustable in the distance to which it extends into said bore.

4. Fluid proportioning apparatus comprising:
a reciprocating, double acting, first pump for pumping a first fluid at a predetermined rate;
a second pump comprising:
> a housing having a bore therein and a counterbore axially aligned with, and of smaller diameter than, said bore;
> a compound free piston in said housing and reciprocably movable in said bore and counterbore, said free piston including a relatively large diameter portion positioned in said bore and dimensioned to fit loosely in said bore whereby a driving liquid can by-pass the large diameter portion of said compound piston so that the fluid proportioning pump is self-priming and air locking is avoided, said compound free piston further having a relatively small diameter portion partially positioned in said counterbore and connected to said large diameter portion of said free piston in axial alignment therewith; and means on said housing and projecting into the interior thereof for adjusting the length of the stroke of said compound free piston in said bore and counterbore;

means interconnecting said first pump with said second pump for supplying fluid from said first pump alternately to said counterbore, and then to one end of said bore of said second pump to drive said compound free piston in reciprocation at a rate correlated to the rate of pumping of said first pump;

means for introducing a second fluid to the bore of said second pump on the opposite side of the large diameter portion of said compound free piston from the side thereof upon which fluid from said first pump is introduced to said bore; and means for conveying said second fluid from said bore when said second fluid is discharged by the stroke of said compound free piston, said means for introducing said second fluid and means for conveying said second fluid containing check valve means for assuring unidirectional flow of fluid therethrough.

5. Fluid proportioning apparatus comprising:

a reciprocating, double acting, first pump for pumping a first fluid at a predetermined rate;

a second pump comprising:
  a housing having a bore therein and a counterbore axially aligned with, and of smaller diameter than, said bore;
  a compound free piston in said housing and reciprocably movable in said bore and counterbore, said free piston including a relatively large diameter portion positioned in said bore and a relatively small diameter portion partially positioned in said counterbore and connected to said large diameter portion of said free piston in axial alignment therewith, said relatively large diameter portion of said compound free piston being of lesser diameter than the bore of said housing to permit fluid to pass by said free piston in said bore; and
  an adjustable stop screw threadedly mounted in said housing and extending into said bore for contact with said compound free piston on the opposite side thereof from said counterbore at one time during its stroke, said stop screw being adjustable in the distance to which it extends in said bore;

a first conduit extending from said first pump to the housing of said second pump and communicating with said bore on the same side of said compound free piston as said adjustable stop screw is located;

a second conduit extending from said first pump to said second pump and communicating with said counterbore beyond the end of said relatively small diameter portion of said compound free piston;

an additive inlet conduit connected to said housing and communicating with said bore on the opposite side of said free piston from said adjustable stop screw;

a check valve in said additive inlet conduit preventing flow of fluid from said bore into said additive inlet conduit from said bore while permitting flow of fluid in the opposite direction;

an additive discharge conduit connected to said housing and communicating with said bore on the opposite side of said free piston from said adjustable stop screw; and a second check valve in said additive discharge conduit and preventing flow of said second fluid from said additive discharge conduit into said bore while permitting flow of fluid in the opposite direction.

6. Fluid proportioning apparatus comprising:

a first pump for pumping a first fluid at a predetermined rate;

a second pump comprising:
  a housing having a bore therein and a counterbore axially aligned with, and of smaller diameter than, said bore;
  a compound free piston in said housing and reciprocably movable in said bore and counterbore, said free piston including a relatively large diameter portion positioned in said bore and dimensioned to fit loosely in said bore whereby a driving liquid can by-pass the large diameter portion of said compound piston so that the fluid proportioning pump is self-priming and air locking is avoided, said compound free piston further having a relatively small diameter portion partially positioned in said counterbore and connected to said large diameter portion of said free piston in axial alignment therewith; and
  means on said housing and projecting into the interior thereof for adjusting the length of the stroke of said compound free piston in said bore and counterbore;

means interconnecting said first pump with said second pump for supplying fluid from said first pump alternately to said counterbore, and then to one end of said bore of said second pump to drive said compound free piston in reciprocation at a rate correlated to the rate of pumping of said first pump;

means for introducing a second fluid to the bore of said second pump on the opposite side of the large diameter portion of said compound free piston from the side thereof upon which fluid from said first pump is introduced to said bore; and means for conveying said second fluid from said bore when said second fluid is discharged by the stroke of said compound free piston, said means for introducing said second fluid and means for conveying said second fluid containing check valve means for assuring unidirectional flow of fluid therethrough.

7. Apparatus for proportionately pumping a small measured quantity of an added fluid while concurrently pumping a relatively large quantity of a second fluid in a constant ratio with respect to the additive fluid, said apparatus comprising:

a double acting, first reciprocating pump;

an additive proportioning second pump comprising:
  a housing having a cylindrical bore and an axially aligned, communicating counterbore therein, with said counterbore being of smaller diameter than said bore, said housing further having an elongated fluid port communicating with said counterbore and being in axial alignment with said counterbore and said bore;
  a free compound piston slidably mounted in the bore and counterbore within said housing and having a first, relatively large diameter, cylindrical portion slidably mounted in said bore, and a second, cylindrical portion of smaller diameter than said first portion connected to and extending axially from said first portion, said second portion of said free piston extending into said counterbore and being of greater length than said counterbore whereby when said second portion abuts the end of said counterbore adjacent said port and remote from said bore, said first portion of said free piston is spaced from the end of said bore adjacent said counterbore;

a first pair of conduits connected to said double acting, first reciprocating pump for conveying said second fluid to said double acting, first reciprocating pump during one cycle of the double action thereof, and for conveying a major fraction of said second fluid away from said double acting, first reciprocating pump during the second cycle of the double action thereof;

a second pair of fluid conduits connected to said double acting, first reciprocating pump for conveying said second fluid to said double acting, first reciprocating pump during said second cycle, and for conveying a major fraction of said fluid to be pumped from said double acting, first reciprocating pump during said one cycle of said double action thereof;

a fifth fluid conduit connected between said first reciprocating pump and a portion of the bore in the housing of said proportioning pump which is located on the opposite side of said free piston from said counterbore for conveying from said first reciprocating pump to said bore, a fraction of the total fluid pumped by said first pump during one cycle of its double action;

a sixth conduit connected between said first reciprocating pump and the port in said housing of said proportioning pump to convey via said port to said counterbore, a fraction of the total fluid pumped by said first pump during the second cycle of its double action;

an additive fluid inlet conduit connected to said housing of said proportioning pump and communicating with said bore on the side of the large diameter portion of said free piston on which said counterbore is located, said additive fluid inlet conduit communicating with said bore and the space between said one end of said bore adjacent said counterbore and said first portion of said free piston when said second portion of said free piston abuts the end of said counterbore which is remote from said bore;

a check valve in said additive fluid inlet conduit preventing flow of fluid from said bore into said additive fluid inlet conduit while permitting flow of fluid in the opposite direction;

an additive fluid discharge conduit connected to said housing and communicating with said bore on the diametrically opposite side of said bore from said additive inlet conduit and on the side of the large diameter portion of said free piston on which said counterbore is located;

a second check valve in said additive fluid discharge conduit and preventing flow of said additive fluid from said additive fluid discharge conduit into said bore while permitting flow of fluid in the opposite direction; and an adjustable stop screw threadedly mounted in said housing and extending into said bore on the opposite side of the large diameter portion of said free piston from said counterbore for contact with said large diameter portion of said free piston at one time during the stroke of said free piston, said stop screw being adjustable in the distance to which it extends into said bore.

References Cited

UNITED STATES PATENTS

| | | | |
|---|---|---|---|
| 60,146 | 12/1866 | Crutchfield | 103—203 |
| 1,304,330 | 5/1919 | Laursen | 103—44 |
| 1,702,649 | 2/1929 | Gentzen | 103—9 |
| 2,118,234 | 5/1938 | Rupp | 103—203 |
| 2,675,760 | 4/1954 | Hall | 103—44 |
| 3,178,888 | 4/1965 | Hampton | 103—9 |
| 3,235,129 | 2/1966 | Kruckeberg | 103—9 |
| 3,359,909 | 12/1967 | Johnson et al. | 103—6 |

FOREIGN PATENTS 274,380   7/1927   Great Britain.

WILLIAM L. FREEH, *Primary Examiner.*

U.S. Cl. X.R.

103—38, 203